(12) United States Patent
Toft et al.

(10) Patent No.: US 11,007,760 B2
(45) Date of Patent: *May 18, 2021

(54) MULTILAYER COMPOSITE

(71) Applicant: Arkema France, Colombes (FR)

(72) Inventors: Adam N. Toft, Norristown, PA (US); Jack Reed, Milton, DE (US); Amy A. Lefebvre, Pottstown, PA (US); Charles C. Crabb, Royersford, PA (US); Florence Mehlmann, Berwyn, PA (US)

(73) Assignee: Arkema France, Colombes (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,068

(22) Filed: Jan. 23, 2020

(65) Prior Publication Data

US 2020/0156357 A1 May 21, 2020

Related U.S. Application Data

(63) Continuation of application No. 14/770,946, filed as application No. PCT/US2014/027085 on Mar. 14, 2014, now Pat. No. 10,562,282.

(Continued)

(51) Int. Cl.
*B32B 27/20* (2006.01)
*B32B 27/30* (2006.01)
(Continued)

(52) U.S. Cl.
CPC .............. *B32B 27/304* (2013.01); *B32B 7/12* (2013.01); *B32B 27/08* (2013.01); *B32B 27/302* (2013.01);
(Continued)

(58) Field of Classification Search
CPC ............ B32B 2270/00; B32B 2274/00; B32B 2307/3065; B32B 2307/536;
(Continued)

(56) References Cited

U.S. PATENT DOCUMENTS

| 4,317,860 A | 3/1982 | Strassel |
| 4,415,519 A | 11/1983 | Strassel ............... B29C 47/0023 264/173.13 |

(Continued)

FOREIGN PATENT DOCUMENTS

| CN | 101407617 | 4/2009 |
| CN | 102002203 | 4/2011 |

(Continued)

*Primary Examiner* — Lawrence D Ferguson
(74) *Attorney, Agent, or Firm* — Thomas F. Roland

(57) ABSTRACT

The invention relates to multilayer composites having improved weathering properties without reducing flame retardation properties. The composites have a fluoropolymer layer over a thermoplastic layer. The multilayer composite may be a fluoropolymer layer directly over a relatively flammable substrate or non-flammable substrate (like PVC), or it may be a fluoropolymer layer over a relatively flammable cap layer, over a substrate (that is flammable or non-flammable). The composite is formed using coating, coextrusion and/or lamination techniques. The multilayer composite is especially useful in articles having surfaces that are used in a relatively horizontal position, including decking, railings, roofing and window profiles. The composites provide improved weathering for the substrate without a reduction in flame-resistance, when compared to the substrate without the outer fluoropolymer layer. The multi-layer composite also provides enhanced chemical resistance, hardness, scratch and mar, and water resistance.

16 Claims, 1 Drawing Sheet

| Fluoropolymer |
| Tie-Layer |
| Flame Retardant Thermoplastic Cap |
| Substrate |

Related U.S. Application Data

(60) Provisional application No. 61/786,752, filed on Mar. 15, 2013, provisional application No. 61/901,556, filed on Nov. 8, 2013, provisional application No. 61/901,550, filed on Nov. 8, 2013.

(51) Int. Cl.

| | |
|---|---|
| *B32B 27/08* | (2006.01) |
| *B32B 27/32* | (2006.01) |
| *B32B 27/36* | (2006.01) |
| *B32B 7/12* | (2006.01) |
| *B32B 27/40* | (2006.01) |
| *B32B 37/14* | (2006.01) |
| *E04F 15/10* | (2006.01) |

(52) U.S. Cl.
CPC ............ *B32B 27/308* (2013.01); *B32B 27/32* (2013.01); *B32B 27/365* (2013.01); *B32B 27/40* (2013.01); *B32B 37/14* (2013.01); *B32B 27/20* (2013.01); *B32B 2270/00* (2013.01); *B32B 2274/00* (2013.01); *B32B 2307/3065* (2013.01); *B32B 2307/536* (2013.01); *B32B 2307/584* (2013.01); *B32B 2307/712* (2013.01); *B32B 2307/714* (2013.01); *B32B 2307/7265* (2013.01); *B32B 2419/00* (2013.01); *E04F 15/107* (2013.01); *E04F 2290/045* (2013.01)

(58) Field of Classification Search
CPC ........ B32B 2307/584; B32B 2307/712; B32B 2307/714; B32B 2307/7265; B32B 2419/00; B32B 27/08; B32B 27/20; B32B 27/302; B32B 27/304; B32B 27/308; B32B 27/32; B32B 27/365; B32B 27/40; B32B 37/14; B32B 7/12; E04F 15/107; E04F 2290/045
See application file for complete search history.

(56) References Cited

U.S. PATENT DOCUMENTS

| | | | |
|---|---|---|---|
| 5,506,031 A | * | 4/1996 | Spain ................. B29C 37/0025 428/142 |
| 6,696,513 B1 | | 2/2004 | Welton et al. |
| 6,811,859 B2 | | 11/2004 | Bonnet et al. |
| 7,867,604 B2 | | 1/2011 | Bonnet et al. |
| 7,947,781 B2 | | 5/2011 | Arndt et al. |
| 8,129,455 B2 | | 3/2012 | Charoensirisomboon et al. |
| 2004/0213988 A1 | | 10/2004 | Skillman ................. B05D 1/045 428/327 |
| 2004/0249022 A1 | | 12/2004 | Su |
| 2008/0032101 A1 | | 2/2008 | Reilly |
| 2008/0145652 A1 | | 6/2008 | Bonnet et al. |
| 2008/0220274 A1 | * | 9/2008 | Cohen ................. B32B 27/306 428/500 |
| 2008/0248294 A1 | | 10/2008 | Cohen et al. |
| 2008/0293837 A1 | | 11/2008 | Toft et al. |
| 2010/0000601 A1 | | 1/2010 | Burchill |
| 2010/0175742 A1 | | 7/2010 | Burchill et al. |
| 2012/0073632 A1 | | 3/2012 | Kosar et al. |
| 2012/0135221 A1 | | 5/2012 | Weidinger et al. |

FOREIGN PATENT DOCUMENTS

| | | |
|---|---|---|
| JP | 61106649 | 5/1986 |
| JP | 5279531 | 10/1993 |
| JP | 5279532 | 10/1993 |
| JP | 8157732 | 6/1996 |
| JP | 9124863 | 5/1997 |
| WO | WO 2012/009329 A1 | 1/2012 |
| WO | WO2013/025739 A1 | 2/2013 |
| WO | WO2013/033313 | 3/2013 |
| WO | WO2014/152473 | 9/2014 |

\* cited by examiner

MULTILAYER COMPOSITE

CLAIM TO PRIORITY

This application in a Continuation Application of, and claims benefit to, copending U.S. application Ser. No. 14/770,946, filed Aug. 27, 2015; which claimed benefit, under U.S.C. § 119 or § 365 of PCT Application Number PCT/US2014/027085, filed Mar. 14, 2014, and U.S. Provisional Application 61/786,752, filed Mar. 15, 2013; U.S. 61/901,556, filed Nov. 8, 2013; and U.S. 61/901,550, filed Nov. 8, 2013. The disclosure of each of these applications is incorporated herein by reference in its entirety for all purposes.

FIELD OF THE INVENTION

The invention relates to multilayer composites having improved weathering properties without reducing flame retardation properties. The composites have a fluoropolymer layer over a thermoplastic layer. The multilayer composite may be a fluoropolymer layer directly over a relatively flammable substrate or non-flammable substrate (like PVC), or it may be a fluoropolymer layer over a relatively flammable cap layer, over a substrate (that is flammable or non-flammable). The composite is formed using coating, coextrusion and/or lamination techniques. The multilayer composite is especially useful in articles having surfaces that are used in a relatively horizontal position, including decking, railings, roofing and window profiles. The composites provide improved weathering for the substrate without a reduction in flame-resistance, when compared to the substrate without the outer fluoropolymer layer. The multi-layer composite also provides enhanced chemical resistance, hardness, scratch and mar, and water resistance.

BACKGROUND OF THE INVENTION

Many structural plastics exhibit attractive mechanical properties when extruded, molded, or formed into various articles of manufacture. Such articles include, for example, bathtubs, shower stalls, counters, appliance housings and liners, building materials, doors, windows, siding, decking, railings and shutters, lawn and garden applications, marine applications pool application, and storage facilities. Although these structural plastics are strong, tough and relatively inexpensive, the properties of their exposed surfaces are less than ideal. That is, the surfaces of the structural plastics are degraded by light; they can be easily scratched, and can be eroded by common solvents.

Consequently, it has become a practice in the industry to apply another resinous material over the structural plastic to protect the underlying structural material and provide a surface that can withstand abuse associated with the use environment. Such surfacing materials are called "capstocks".

The capstock generally is much thinner than the structural plastic, typically being about 5 to about 25% of the total thickness of the multilayer structure comprising the capstock and structural plastic plies. For example, the thickness of the capstock can be about 0.05 to about 2.5 mm, whereas the thickness of the structural plastic ply can be about 1.0 to about 50 mm, and preferably 2.5 to 30 mm.

One issue with most of the capstocks currently used, such as acrylics and styrenics, is that they are relatively flammable. For instance, these capstock materials decrease the flame retardancy of substrates based on polyvinyl chloride (PVC). There is a desire to maintain the weather-resistant properties of the capstock, while improving its flame retardancy.

Flame retardant compounds for use in thermoplastics are well known. Most of these involve iodine and/or bromine compounds, such as aliphatic and aromatic bromine compounds, as for styrenic resins as described in US 2012-0184638, or a compound based on phosphorous, or antimony. The problem with these flame retardants is that they tend to have toxicity issues, and with the recommended usage levels of 5-30 weight percent, these flame retardants adversely effect the physical properties (such as tensile strength) of the polymer.

U.S. Pat. No. 8,129,455 describes a flame retardant ASA used at 15-30 wt percent, and made up of 20-80 percent graphite, 20-80 percent of a phosphorous flame retardant, and 0.1 to 2% of a perfluorinated polyolefin.

Fluoropolymers, and in particular polyvinylidene fluoride (PVDF) polymers, are known to provide excellent resistance to weathering, chemical, and water. PVDF films are used to protect surfaces, such as photovoltaic modules, such as those described in US 2010/0175742 and US 2012/0073632.

Fluoropolymers have been added to acrylic polymer matrices to improve weatherability, adhesion to fluoropolymers and impact resistance (U.S. Pat. No. 6,811,859, US2008-0293837, US 2008-0032101, U.S. Pat. No. 7,947,781).

A blend of 5-60% fluoropolymer blended into thermoplastic capstocks to improve flame retardancy of a composite capstock over a substrate, is described in U.S. application No. 61/786,752.

A coextrudable composite film having a PVDF layer over a layer that is a blend of PVDF, an acrylic and an acrylic elastomer are described in U.S. Pat. No. 6,811,859. This film can be used as a protective layer over a substrate.

Transparent multi-layer films that will not stress-whiten having a layer of PVDF over PMMA layer are disclosed in US '604.

Multi-layer laminates of PVDF, an acrylic, and a thermoplastic formed by coextrusion and having no discrete layers are described in U.S. Pat. Nos. 4,415,519 and 4,317,860.

Surprisingly it has been found that a weatherable, flame-retardant composite can be formed with a fluoropolymer layer as an outer layer. In one embodiment a relatively flammable capstock layer is placed over a substrate to improve weatherablity, and a fluoropolymer layer is placed over the capstock layer to provide a flame resistant composite. In addition to excellent weathering resistance and flame-resistance, the composite of the invention has improvements in water resistance, chemical resistance, and appearance.

SUMMARY OF THE INVENTION

The invention relates to a weatherable multilayer composite comprising:
a) an outer fluoropolymer layer
b) a thermoplastic substrate layer.

The invention further relates to a weatherable multilayer composite having, in order, an outer fluoropolymer layer, a middle flammable layer and a thermoplastic substrate layer.

The invention also relates to articles formed from the weatherable, flame-resistant composite, and to a process for forming the articles.

DETAILED DESCRIPTION OF THE INVENTION

Figure 1:
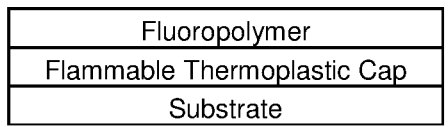
FIGS. 1-7 represent several of the possible configurations of the multi-layer composites of the invention.

The invention relates to a weatherable, flame-retardant, multi-layer structure having a fluoropolymer outer layer over a substrate layer. In a preferred embodiment, the fluoropolymer layer is placed over a flammable thermoplastic layer that is placed as a cap layer over a substrate. The invention further relates to methods for forming the multi-layer composite structure, and articles formed from this composite.

As used herein, "weatherable" is a measurable characteristic known to one skilled in the art that shows how well a material or product performs during exposure to outdoor weather conditions, such as ultraviolet light, rain, snow, high and low temperatures, humidity, environmental pollution, acidity in the air, and the like. A weatherable material desirably exhibits little or no adverse effects (e.g., discoloration, disintegration, wear) due to prolonged exposure to the environment.

Fluoropolymer

The fluoropolymer layer will be the outer layer of the composite, the layer exposed to the environment, and in particular the layer that is exposed directly to solar radiation. This layer is relatively thin—within the range of 0.01 mm to 0.2 mm, preferably from 0.02 mm to 0.1 mm in thickness, and more preferably from 0.025 mm to 0.08. The fluoropolymer layer may be a fluoropolymer coating, monolayer film, or multilayer fluoropolymer film. The fluoropolymer layer contains at least 61 weight percent of fluoropolymer, preferably at least 75 weight percent fluoropolymer, more preferably at least 90 weight percent fluoropolymer, and most preferably greater than 95 weight percent and even 100 weight percent fluoropolymer, as the polymeric component. Blends of two or more fluoropolymers are anticipated in the invention. Other polymer that are compatible with the fluoropolymer, may optionally be present at low levels, preferably at less than 30 weight percent, more preferably at less than 20 weight percent and even more preferably at less than 15 weight percent.

Useful fluoropolymers include, but are not limited to polyvinylidene fluoride (PVDF), ethylene tetrafluoroethylene (ETFE), terpolymers of ethylene with tetrafluoroethylene and hexafluoropropylene (EFEP), terpolymers of tetrafluoroethylene-hexafluoropropylene-vinyl fluoride (THV), copolymers of vinyl fluoride, and blends of PVDF with functionalized or unfunctionalized polymethyl methacrylate polymers and copolymers. The fluoropolymers may be functionalized or unfunctionalized, and could be homopolymers or copolymers—preferably copolymers with other fluorine monomers including vinyl fluoride; vinylidene fluoride (VDF); trifluoroethylene (VF3); chlorotrifluoroethylene (CTFE); 1,2-difluoroethylene; tetrafluoroethylene (TFE); hexafluoropropylene (HFP); perfluoro(alkyl vinyl) ethers, such as perfluoro(methyl vinyl) ether (PMVE), perfluoro(ethyl vinyl) ether (PEVE) and perfluoro(propyl vinyl) ether (PPVE); perfluoro(1,3-dioxole); perfluoro(2,2-dimethyl-1,3-dioxole) (PDD), and blends thereof. Homopolymers of PVDF and PVDf copolymers containing at least 70 weight percent VDF units, and the remaining monomer units being other fluoromonomers.

In one embodiment of the invention, the fluoropolymer is a copolymer of vinylidene fluoride and hexafluoropropylene (HFP), having from 1 to 30 weight percent of HFP.

The fluoropolymer outer layer may be a monolayer, or else a multilayer structure that is used for added strength (especially a 2, 3, or 4 layer film) or for improved adhesion to the intermediate cap layer. In a multi-layer fluoropolymer film, the compositions of the layers may be the same or different.

If the fluoropolymer is in the form of a monolayer or multilayer film, the surface of the film that will be in contact with the adjacent intermediate cap layer can be surface treated to improve adhesion to the intermediate cap layer. Any method known in the art to increase the surface energy of this surface can be used including but not limited to corona, plasma, flame, e-beam, sodium etching, or chemical treatment.

In the case where the fluoropolymer layer is placed directly onto the substrate layer, as in the case of a fluoropolymer layer directly in contact with a PVC substrate, either the fluoropolymer layer must be surface treated, or else a tie layer or adhesive layer is required in order for the fluoropolymer and PVC layers to adhere. Further, for proper weathering and UV protection in a composite of a fluoropolymer over a PVC, either the fluoropolymer layer or the tie layer must be pigmented to block UV light from reaching the PVC. In a preferred embodiment, the tie layer or adhesive layer is pigmented. In one embodiment, the tie layer contains less than 25 weight percent of acrylic polymer.

Substrate

The substrate layer of the multi-layer composite is a thermoplastic. The substrate layer would be in the range of 1.0 to 50 mm, and preferably 2.5 to 30 mm in thickness.

Thermoplastics useful in the present invention, include but not limited to acrylic polymers, styrenic polymers, polyolefins, polyvinyl chloride (PVC), polycarbonate (PC), polyurethane (PU), or mixtures thereof.

Styrenic polymers, as used herein, include but are not limited to, polystyrene, high-impact polystyrene (HIPS), acrylonitrile-butadiene-styrene (ABS) copolymers, acrylonitrile-styrene-acrylate (ASA) copolymers, styrene acrylonitrile (SAN) copolymers, methacrylate-acrylonitrile-butadiene-styrene (MABS) copolymers, styrene-butadiene copolymers (SB), styrene-butadiene-styrene block (SBS) copolymers and their partially or fully hydrogenenated derivatives, styrene-isoproene copolymers styrene-isoprene-styrene (SIS) block copolymers and their partially or fully hydrogenenated derivatives, styrene-(meth)acrylate copolymers such as styrene-methyl methacrylate copolymers (S/MMA), and mixtures thereof. A preferred styrenic polymer is ASA. Styrenic copolymers of the invention have a styrene monomer content of at least 10 percent by weight, preferably at least 25 percent by weight.

Acrylic polymers, as used herein, include but are not limited to, homopolymers, copolymers and terpolymers comprising alkyl methacrylates.

The alkyl methacrylate monomer is preferably methyl methacrylate, which may make up from 60 to 100 of the monomer mixture. 0 to 40 percent of other acrylate, methacrylate, and/or other vinyl monomers may also be present in the monomer mixture. Other methacrylate, acrylate, and other vinyl monomers useful in the monomer mixture include, but are not limited to methyl acrylate, ethyl acrylate and ethyl methacrylate, butyl acrylate and butyl methacrylate, iso-octyl methacrylate and acrylate, lauryl acrylate and lauryl methacrylate, stearyl acrylate and stearyl methacrylate, isobornyl acrylate and methacrylate, methoxy ethyl acrylate and methacrylate, 2-ethoxy ethyl acrylate and methacrylate, dimethylamino ethyl acrylate and methacrylate monomers, styrene and its derivatives. Alkyl (meth) acrylic acids such as (meth)acrylic acid and acrylic acid can be useful for the monomer mixture. Small levels of multifunctional monomers as crosslinking agents may also be used. A preferred acrylic polymer is a copolymer of methyl methacrylate and 2-16 percent of one or more $C_{1-4}$ acrylates.

Polyvinyl chloride (PVC) substrate polymers include polyvinyl chloride, chlorinated PVC, foamed or expanded PVC, filled PVC, including PVC or expanded PVC filled at 0.1 to 80 weight percent with fillers, including but not limited to cellulosic fibers, calcium carbonate, rosin, limestone, aluminum trihydrate, quartz, and silica.

The thermoplastic polymers of the invention can be manufactured by any means known in the art, including emulsion polymerization, solution polymerization, and suspension polymerization. In one embodiment, the thermoplastic matrix has a weight average molecular weight of between 50,000 and 500,000 g/mol, and preferably from 75,000 and 150,000 g/mol, as measured by gel permeation chromatography (GPC). The molecular weight distribution of the thermoplastic matrix may be monomodal, or multimodal with a polydispersity index greater than 1.5.

Especially preferred thermoplastics for the matrix polymer are styrenic polymers (including SAN, ABS, MABS, ASA, HIPS), acrylic polymers and PVC.

It is also anticipated that the invention will also work with thermoset plastic matrices, though they are often not as useful as substrates in many applications.

Intermediate Thermoplastic Layer

In a preferred embodiment of the invention, a thermoplastic intermediate layer (also called a cap layer or capstock layer) is provided between the fluoropolymer outer layer, and the substrate layer. The intermediate layer is selected to provide additional protection to the multi-layer composite, such as weatherability, UV resistance, barrier layer properties, adhesion, other physical and mechanical property improvements, or for aesthetics. The intermediate layer could consist of multiple layers of the same or different compositions, and could be flammable or non-flammable, In one embodiment the intermediate may be a flammable thermoplastic material. Preferred intermediate layers include acrylic polymers, styrenic polymers, polycarbonates, polyolefins, as described above for the substrate layer, and blends of these polymers with other thermoplastics. Especially preferred are acrylic and styrenic intermediate layers.

In one preferred embodiment, the intermediate layer is an acrylic polymer. An especially preferred acrylic polymer is a homopolymer or copolymer having at least 70 weight percent methyl methacrylate units. An acrylic layer provides excellent weatherability and appearance to the substrate, but adds to the flammability of the composite. However, an acrylic layer may essentially form an effective cap layer for improved properties, when covered by the thin fluoropolymer layer providing the needed flame-retardancy.

The acrylic intermediate layer may include impact modifiers at from 20-60 weight percent based on the acrylic matrix. Useful impact modifiers include linear block copolymers, and preferably core shell polymers, as known in the art. Hard-core, core-shell impact modifiers are especially preferred.

The acrylic polymer may also be an alloy of the acrylic polymer with a compatible polymer, such as polyvinylidene fluoride, or a bio polymer, including, but not limited to polylactic acid (PLA).

In another preferred embodiment, the intermediate layer contains a styrenic polymer preferably an ASA copolymer, and more preferably an ASA/PVC alloy.

In one embodiment, the intermediate layer is a foamed polymer, having a density reduction of at least 5% based on the un-foamed polymer.

The intermediate layer can have a thickness of from 0.05 to 2.5 mm, preferably from greater than 0.1 mm to 2.0 mm thick, and more preferably from greater than 0.2 to 1.5 mm thick.

Advantageously, the intermediate layer is pigmented, to provide color to the multi-layer composite.

Other Layers

The fluoropolymer layer, intermediate layer and substrate layers of the multi-layer composite, may each, independently, consist of one or more layers. Additionally, tie layers or adhesive layers may optionally be used between layers. When a tie layer or adhesive layer is present, it may further contain additives, including but not limited to, impact modifiers, UV stabilizers and absorbers, pigments, and fillers.

Additives

While the fluoropolymer layer provides the composite with good flame-retardancy, small amounts of other flame retardants (above 0.0001 weight percent) may also be blended into the composite. Preferably other flame retardants are used at a level below 20 weight percent, preferably below 10 weight percent, more preferably below 5 weight percent, and even more preferably below 3 weight percent are used, based on the total weight of polymer (matrix polymer and fluoropolymer).

Useful flame retardants include, but are not limited to compounds of tungstate, molybdate, silicate, phosphorous, bromine, and iodine.

The composite of the present invention may also contain, in one or more layers, one or more typical additives for polymer compositions used in usual effective amounts, including but not limited to impact modifiers (both core-shell and linear block copolymers), stabilizers, plasticizers, fillers, coloring agents, pigments, antioxidants, antistatic agents, surfactants, toner, refractive index matching additives, additives with specific light diffraction, light absorbing, or light reflection characteristics, dispersing aids, radiation stabilizers such as poly(ethylene glycol), poly (propylene glycol), butyl lactate, and carboxylic acids such as lactic acid, oxalic acid, and acetic acid, light modification additives, such as polymeric or inorganic spherical particles with a particle size between 0.5 microns and 1,000 microns.

Process for Forming Composite

The composite structure may be formed in many different ways, including one or more coatings, laminations and co extrusions.

The components of each layer are blended together, typically as powders and/or pellets, then melt-blended in an extruder, in the case of an extruded or coextruded layer(s).

In the case of a two-layer structure, the fluoropolymer layer and the substrate layer can be co-extruded, or the layers can be formed separately, then laminated. The fluoropolymer may also be formed into a film or sheet and then laminated or insert-molded over one or more sides of a substrate. The fluoropolymer layer could also be applied to the substrate, as a coating, including in-line as described in U.S. Pat. No. 8,071,176. The final multi-layer structure, comprising the substrate and flame-retardant layer(s), may be directly extruded in a profile shape (such as for decking, posts, railing, window profiles), or can be extruded in a sheet form and then be thermoformed into a final shape.

For an article made of the multi-layer sheet having a thin fluoropolymer layer, an intermediate layer, and a substrate layer, the composite; any combination of coextrusion and/or lamination or coating may be used.

In a preferred embodiment, a coextrusion of the intermediate layer over the substrate layer can be produced, followed by the lamination or coating of the thin fluoropolymer layer onto the intermediate layer. This allows for a thicker intermediate layer, and a thinner fluoropolymer layer than is practical in a coextrusion. Film lamination is also less capital intensive than a three-layer coextrusion.

Use

Figure 2:
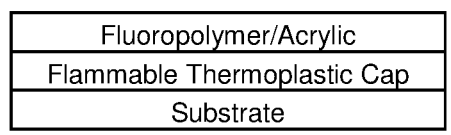
Figure 3:
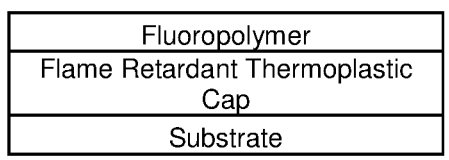
Figure 4:
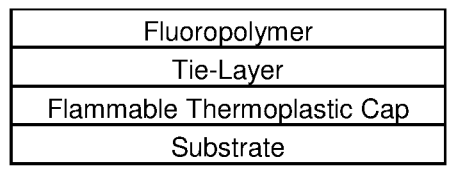
Figure 5:
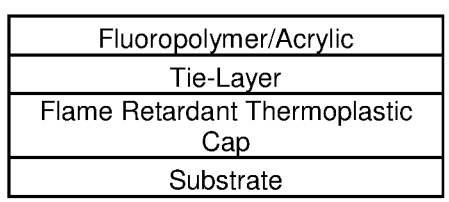
Figure 6:
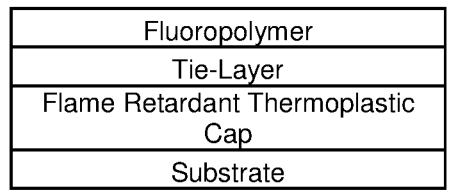
Figure 7:
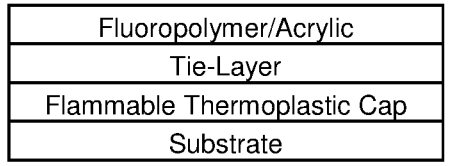

The composite compositions of the invention are useful in forming articles requiring flame retardancy. Non-limiting examples of articles using the composition of the invention are shown in FIGS. 1-7. When tested in an ASTM E84 flame retardancy test, the composite with the fluoropolymer would be expected to achieve rating at least one letter grade higher compared to a similar composition without the fluoropolymer layer. Preferably the multi-layer composite of the invention will achieve an ASTM E84 rating of at least a Class B, and most preferably a rating of Class A. Articles made with the composition of the invention also have excellent water resistance and appearance.

The composites of the invention, when tested by UL-94 flame test should obtain a UL-94 rating of at least one Class higher (V0, V1, V2) than a multi-layer structure of the same composition but without the fluoropolymer layer.

The multi-layer composite of the invention is especially useful for railings, decking, fencing, window profiles and roofing articles. The composite is especially useful for articles used in a relatively horizontal position. By "relatively horizontal", as used herein, is meant that the article is used in the final application in a horizontal position, or at an angle of less than 45° from horizontal.

EXAMPLES

Comparative Example 1

The following comparative example was prepared by melt coextrusion:

Flammable Thermoplastic Capstock[1]
Flame Retardant Substrate[2]

[1]Solarkote-A ® 200-101 acrylic capstock from Arkema, Inc.
[2]PA-765 flame retardant ABS from Chimei The coextrusion line was made up of a 1.25" Davis Standard main extruder for the substrate and a 1" Davis Standard satellite extruder. The polymer melts were combined in a 12" wide dual manifold sheet die. The ABS substrate was about 110 mil in thickness and the Solarkote-A capstock was about 14 mil in thickness.

Example 2

The structure from example 1 was heat laminated with a 25 um thick fluoropolymer film by passing through two polishing rolls before the materials from Example 1 had time to solidify.

Fluoropolymer[3]
Flammable Thermoplastic Capstock
Flame Retardant Substrate

[3]Kynar ® 740 from Arkema, Inc.

Example 3

The structure from example 1 was heat laminated with a 50 um thick fluoropolymer film containing a tie-layer on one side by passing through two polishing rolls before the materials from Example 1 had time to solidify.

Fluoropolymer[4]
Tie-Layer[4]
Flammable Thermoplastic Capstock
Flame Retardant Substrate

[4]Kynar ® 502 CUH HC from Arkema, Inc. which is a multi-layer film having a fluoropolymer layer and an Adheflon® tie layer. The flammability of comparative examples 1, and examples 2 and 3 were tested in accordance with UL-94 50 W Vertical Burning Test. The following table summarizes the results:

|  | Flammability Classification |
| --- | --- |
| Comparative Example 1 | V-1 |
| Example 2 | V-0 |
| Example 3 | V-0 |

This demonstrates the advantage of adding a fluoropolymer layer in reducing the overall flammability of a multilayer system.

What is claimed is:

1. An article comprising a weatherable multilayer composite, wherein said multilayer composite comprises, in order:
   a) a thin outer fluoropolymer layer, having a thickness of from 0.01 to 0.2 mm comprising at least 85 weight percent of a polyvinylidene fluoride polymer selected from the group consisting of a) a polyvinylidene fluoride homopolymer, b) a polyvinylidene fluoride copolymer comprising at least 70 weight percent of vinylidene fluoride monomer units, and less than 15 weight percent of other compatible polymers, or c) a mixture thereof;
   b) an intermediate flammable thermoplastic polymer cap layer having a thickness of from 0.5 to 2.5 mm, selected from the group consisting of acrylic and styrenic polymers, and
   c) a thermoplastic substrate layer having a thickness of from 1.0 to 50 mm.

2. The article of claim 1, wherein said intermediate layer comprises a acrylonitrile-styrene-acrylate (ASA) copolymer.

3. The article of claim 1, wherein said outer fluoropolymer layer comprises at least 85 weight percent of said polyvinylidene fluoride polymer.

4. The article of claim 1, wherein said intermediate layer comprises an alloy of ASA and a polyvinyl chloride polymer.

5. The article of claim 1, wherein said fluoropolymer layer comprises two or more fluoropolymer layers, the layers having the same or different compositions.

6. The article of claim 1, wherein said polyvinylidene copolymer comprises from 1 to 30 weight percent of hexafluoropropylene monomer units.

7. The article of claim 1, wherein said substrate is selected from the group consisting of acrylic polymers, styrenic polymers, polyolefins, polyvinyl chloride (PVC), polycarbonate (PC), polyurethane (PU), and mixtures thereof.

8. The article of claim 1, wherein said article further comprises, in one or more layers, one or more additives selected from the group consisting of flame retardants, impact modifiers, core-shell impact modifiers, linear block copolymers impact modifiers, stabilizers, plasticizers, fillers, coloring agents, pigments, antioxidants, antistatic agents, surfactants, toner, refractive index matching additives, additives with specific light diffraction, light absorbing, or light reflection characteristics, dispersing aids, radiation stabilizers, poly(ethylene glycol), poly(propylene glycol), butyl lactate, carboxylic acids, lactic acid, oxalic acid, acetic acid, light modification additives, polymeric spherical particles, and inorganic particles.

9. The article of claim 7, wherein said PVC substrate is selected from the group consisting of foamed PVC, expanded PVC, filled PVC, expanded filled PVC, and expended filled PVC foam.

10. The article of claim 9, wherein said filled PVC, expanded filled PVC, filled foamed PVC or expanded filled PVC foam comprises 0.1 to 80 weight percent of one or more fillers.

11. The article of claim 7, wherein said polyolefin is a filled polyolefin.

12. The article of claim 8, wherein said fillers are selected from the group consisting of cellulosic fibers, calcium carbonate, rosin, limestone, aluminum trihydrate, quartz, and silica.

13. The article of claim 1 wherein said acrylic polymer is a polymethyl methacrylate homopolymer or a copolymer comprising at least 70 weight percent of methyl methacrylate units.

14. The article of claim 1, wherein said article is selected from the group consisting of railing, decking, fencing, window profile, roofing article, appliance, bathtub, shower stall, counter, appliance housings and liners, building material, door, siding, shutter, lawn and garden article, marine article, pool article, outdoor articles, flame-retardant articles, and storage facility.

15. The article of claim 1, wherein said article obtains a UL-94 rating of at least one Class higher than a multi-layer structure of the same composition but without said fluoropolymer layer.

16. The article of claim 1, wherein said article obtains a UL-94 rating of V-0.

* * * * *